June 11, 1968  G. P. CALLAHAN  3,388,057
METHOD FOR THE REDUCTION OF THE HYDROGEN SULFIDE
CONTENT OF DIGESTION GAS
Filed Oct. 10, 1966

GEORGE P. CALLAHAN
INVENTOR.

BY Lyon & Lyon
ATTORNEYS 3,388,057
METHOD FOR THE REDUCTION OF THE
HYDROGEN SULFIDE CONTENT OF DI-
GESTION GAS
George P. Callahan, Torrance, Calif., assignor of fifty
percent to City of Los Angeles, a municipal corpora-
tion of California
Filed Oct. 10, 1966, Ser. No. 585,377
8 Claims. (Cl. 210—7)

ABSTRACT OF THE DISCLOSURE

This patent describes a method for the reduction of the hydrogen sulfide content of digestion gas from the biological decomposition of an aqueous sulfide-containing sewage sludge by injecting oxygen or air directly into the liquid sludge during the biological decomposition, the amount of oxygen added being equal to from about the stoichiometric amount required to convert all hydrogen sulfide to sulfur and water up to about four times the stoichiometric amount, and recovering an evolved fuel gas containing a reduced amount of hydrogen sulfide.

---

Figure 1:
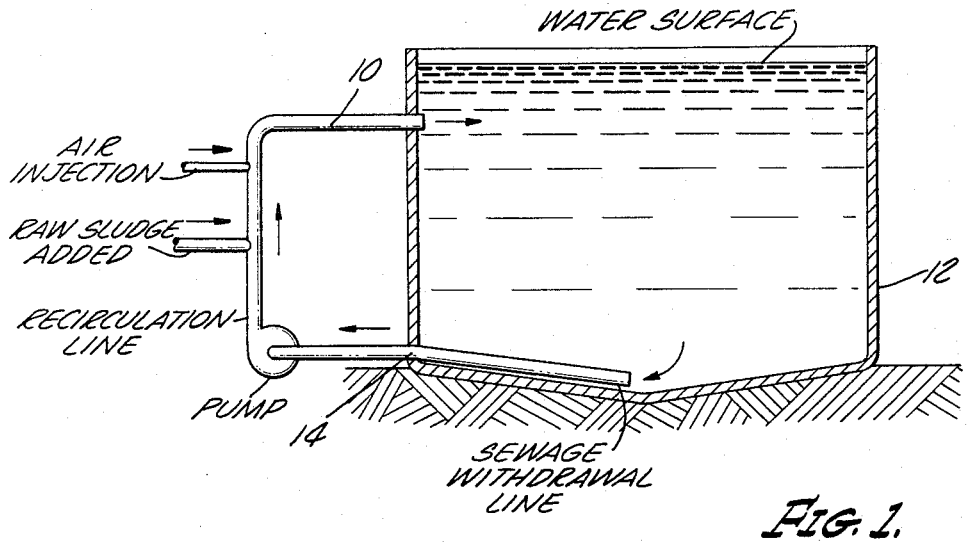

This invention relates to a novel method for the reduction of hydrogen sulfide in gas produced by the digestion of sewage sludge to thus provide combustible fuel gas which contains a tolerable hydrogen sulfide level.

It is already known that the organic matter in sewage sludge may be decomposed by bacteria and other microorganisms.

The organic matter in sewage sludge furnishes an abundant food supply for bacteria and other microorganisms. In the search for food, these microorganisms break down the complex organic materials into simple, and more stable substances. Whatever oxygen was included in the fresh sludge is quickly exhausted, and anerobic decomposition is established. The products of sludge digestion are stable humus-like solid matter, sludge liquor, and gases of decomposition. Sludge digestion under anerobic conditions results from the activities of two groups of bacteria. One group attacks the complex organic substances, the fats, carbohydrates, and proteins, and converts them into simple organic compounds. This group includes many acid-forming bacteria which form fatty acids such as butyric acid, acetic acid, and propionic acid. The second group of organisms includes those which form methane and carbon dioxide by using the organic acids, ammonia and other products formed by the first group of bacteria. The methane-forming bacteria require a narrow range of pH normally from about 6.5 to about 8.0. The organic acids produced by the first group of bacteria are overcome by the buffering action of such alkaline substances as bicarbonates of calcium, magnesium and ammonium, produced by action of other anerobes upon soaps and proteins. It should also be pointed out that sludge bacteriology of sludge digestion is more complicated than indicated above. Other bacteria also involved are the complex processes which result in methane, carbon dioxide and other gases present in digestion gas.

Certain of these above-mentioned microorganisms under the normally prevailing anerobic conditions form a sludge gas containing not only methane, but carbon dioxide, hydrogen sulfide, as well as other gases in small amounts. The heat content or B.t.u. content of a typical sludge gas is about 640 B.t.u. cubic foot. However, the presence of hydrogen sulfide in the gas is objectionable for many applications. For example, even small parts of hydrogen sulfide result in engine damage when the digestion gas is utilized therein. This is due to the formation of corrosive acids in lubricating oil upon the combustion of the hydrogen sulfide in the digestion gas. Moreover, the presence of substantial amounts of hydrogen sulfide in fuel gases is unacceptable under various smog and air pollution control ordinances and regulations which prevail in many of the large metropolitan areas of the United States. In Los Angeles County, the air pollution control district has set an allowable hydrogen sulfide concentration limit of 1,000 parts per 1,000,000 for fuel gas. Thus, any digestion gas produced in this city containing more than 1,000 parts per 1,000,000 of hydrogen sulfide is not acceptable for fuel gas or for any other fuel purpose.

The present invention is, therefore, concerned with the reduction of the hydrogen sulfide concentration in the gas from the digestion of sewage sludge by the injection of oxygen or air into the liquid sludge to yield a fuel gas having a suitably low hydrogen sulfide concentration.

Accordingly, a principal object of the present invention is to provide a novel method for the reduction of hydrogen sulfide in the gases produced by the digestion of sewage sludge.

Another object of the present invention is provision of a fuel gas from the digestion of sewage sludge which has a hydrogen sulfide concentration sufficiently low to permit its use in areas of the country having rigid smog and air pollution control ordinances.

More specifically, it is an object of the present invention to provide for a reduction in the hydrogen concentration in digestion gases by the injection of oxygen or air in the liquid sludge during the digestion process.

These and other objects and advantages of my invention will be apparent from the more detailed description which follows, taken in conjunction with the accompanying drawings.

Briefly, the present invention comprises a novel method for the reduction of hydrogen sulfide concentration in the digestion gas obtained by the biological degradation of liquid sludge which comprises injection of oxygen, normally in the form of an air mixture, into the liquid aqueous sludge during digestion. In general, the amount of air injected is sufficient to effectively lower the hydrogen sulfide content of the gaseous products of digestion.

The initial air injection rate according to the present invention is commonly based on the chemical equation:

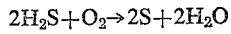

$$2H_2S + O_2 \rightarrow 2S + 2H_2O$$

Based on the foregoing equation, one pound of oxygen will reduce two pounds of hydrogen sulfide. However, initial oxygen application is based on the assumption that only 25 percent of the oxygen combines with hydrogen sulfide. The remaining oxygen is combinable with other material in the digestion system liquid or passes through the system without being absorbed. Thus, the amount of oxygen added is normally about four times the stoichiometric amount theoretically required to convert all hydrogen sulfide to sulfur and water.

The digestion process is most active at a temperature of about 100 degrees F. Below this temperature, the digestion rate slows up until at about 40 degrees F. it virtually ceases. Thus, this invention is normally practiced at a sludge temperature of from about 50 to 120 degrees F.

The precise point of air injection is not critical to the practice of my invention. The drawings illustrate several points of injection which have been found to be suitable. However, any means for oxygen-sludge liquid contact during digestion will aid in reducing the amount of hydrogen sulfide in the evolved digestion gas.

As shown in FIGURE 1, air may be continuously injected into the raw sludge-digested sludge recirculation line 10 adjacent to the digestion tank 12 entrance. The line 10 enters tank 12 about four feet below the water surface. Digested sludge is continuously recirculated. Air may also be injected at the wall of tank 12 far below the liquid surface, in this case at point 14 twenty-six feet below the water surface, as shown in FIGURE 1.

Figure 2:
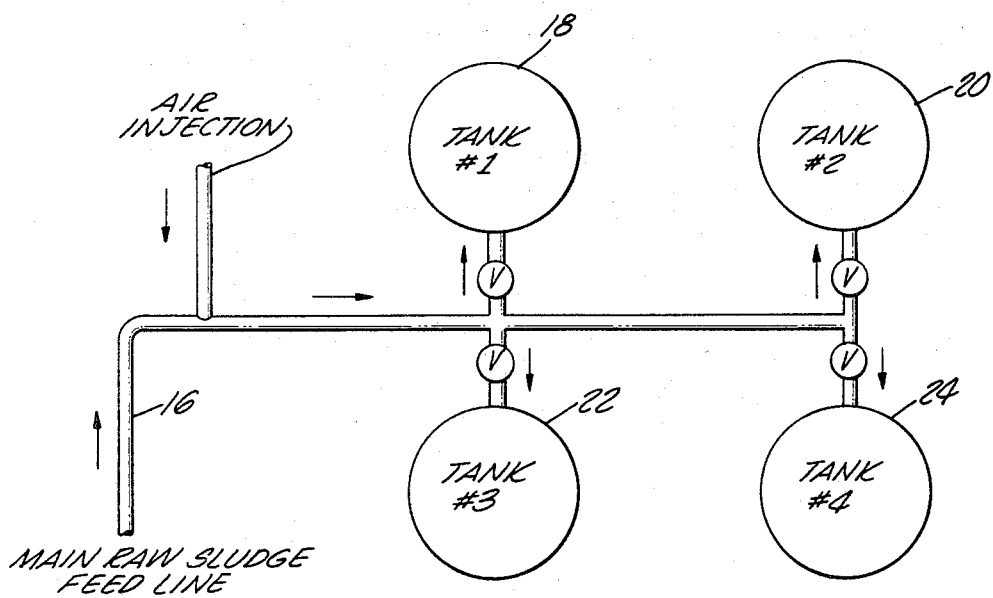

In yet another embodiment, as shown in FIGURE 2, the air is injected into the main raw sludge line 16 that feeds the digestion tanks 18, 20, 22 and 24. All of the raw sludge is routed to one tank at a time. The feeding cycle is automatically rotated between tanks. All tank sludge is recirculated as indicated above.

The following examples are presented solely to illustrate the invention, and should not be regarded as limiting in any way.

EXAMPLE I

Air was injected in raw sludge-digested sludge recirculation line 10, as shown in FIGURE 1. Tank 12 was used for the test with air supplied from the instrument air system through an orifice meter and ⅜″ tubing. A tank similar to tank 12 was used as a control without air injection.

Air required

Given:
(1) Dissolved sulfides in raw sludge=40 p.p.m.
(2) Raw sludge flow=.136 mgd.

Solution:
Lbs./day $H_2S$=.136×8.34×40=45.5 lbs.
Oxygen required at 100% efficiency=45.5×.5=22.75 lbs./day
Assume 25% efficiency $O_2$ required=22.75×4=91 lbs./day
Air rate=91/.23×.075=5200 c.f./day—3.6 c.f.m.

Test procedure (1) Set initial air rate at 3.5 s.c.f.m.
(2) Vary air rate as test results indicate.
(3) Tests: Determine daily the hydrogen sulfide, methane, $CO_2$ and oxygen in the digestion gas.
(4) The daily gas production of the test and control tanks are compared.

Test results

The test results for a 36 day period are shown in Table 1. The best results were obtained when the air rate was 2 s.c.f.m. (49.8 lbs. per day of oxygen). During this period an average reduction in hydrogen sulfide of 77.7% was achieved with an oxygen addition of 2.84 lbs. per lb. of hydrogen sulfide oxidized. The methane content of the digestion gas and all other digestion characteristics were normal.

Test procedure (1) Air was injected into the tank 12 26 feet below the water surface using instrument air and an orifice meter.
(2) Set initial air rate at 30 s.c.f.m.
(3) Vary air rate as test results indicate.
(4) Perform same tests as in Example I.

Test results

The test results are tabulated below in Table 2:

TABLE 2

| Day No. | Air Injected, c.f.m. | $H_2S$, p.p.m. Control Tank | $H_2S$, p.p.m. Tank 12 | Percent $H_2S$ Reduction |
|---|---|---|---|---|
| 1 | 3 | | | |
| 3 | 2.5 | 783 | 603 | 23.0 |
| 4 | 2.5 | 778 | 628 | 19.3 |
| 5 | 2.5 | 921 | 628 | 23.1 |
| 6 | 2.5 | 931 | 757 | 18.7 |
| 7 | 2.5 | 989 | 677 | 31.5 |
| 10 | 4.1 | 984 | 572 | 41.9 |

All standard operating parameters not shown in the above table were normal.

The test results indicate hydrogen sulfide control by air injection.

The chemical and biochemical digestion process activity are determined by the potential between the liquid mass and the hydrogen cell. The potential measured is called the oxidation-reduction potential.

Although the oxidation-reduction potentials are not a quantitative measure of the chemical and biochemical compounds present, the electromotive force represents the relative proportions. In general, it has been determined that optimal digestion is achieved at an oxidation-reduction potential between minus 160 and minus 200 millivolts; and that sulfate production to hydrogen sulfide takes place at an oxidation-reduction potential of about minus 400. The oxidation-reduction potential range of the digestion system of the present invention without air injection is between minus 300 and minus 400 millivolts. Increased air rates tend to change the oxidation-reduction potential closer to the optimal zone of sludge digestion. This enhances the digestion activity, and reduces the hydrogen sulfide content.

TABLE 1.—DIGESTION TANK AIR INJECTION RESULTS

| Day No. | Air Rate, c.f.m. | $H_2S$—Dig. Gas Control | $H_2S$—Dig. Gas Tank 12 | $H_2S$—Dig. Gas Diff. | Percent Rem. | $H_2S$ Removed, lbs./day | Oxygen (lbs.) Add per lb. of $H_2S$ Rem. | Gas Production Tank 12, c.f./day | Percent $O_2$ | Percent $CO_2$ | Percent $CH_4$ |
|---|---|---|---|---|---|---|---|---|---|---|---|
| 1 | 3.5 | | | | | | | 400,000 | | | |
| 6 | 3.5 | 1,340 | 468 | 872 | 65.0 | 23.4 | 3.72 | 400,000 | | | |
| 8 | 3.5 | 1,222 | 311 | 911 | 74.5 | 25.6 | 3.41 | 420,000 | 0 | 37.0 | 63.0 |
| 12 | 3.5 | 1,015 | 254 | 761 | 75.0 | 19.9 | 4.35 | 390,000 | 0.2 | 34.8 | 65.0 |
| 14 | 4.4 | 905 | 205 | 700 | 77.7 | 19.7 | 9.83 | 420,000 | 1.0 | 36.0 | 63.0 |
| 15 | 3.2 | 1,000 | 341 | 659 | 65.9 | 18.6 | 4.29 | 470,000 | 0.2 | 36.8 | 63.2 |
| 18 | 2.0 | 841 | 476 | 365 | 43.4 | 10.5 | 4.75 | 430,000 | 0.2 | 36.6 | 63.4 |
| 19 | 2.0 | 825 | 206 | 619 | 75.0 | 19.1 | 2.60 | 460,000 | 0.2 | 36.4 | 63.6 |
| 20 | 2.0 | 962 | 357 | 605 | 62.8 | 18.2 | 2.74 | 450,000 | 0.2 | 36.6 | 63.4 |
| 22 | 2.0 | 920 | 206 | 714 | 77.7 | 21.6 | 2.30 | 450,000 | 0 | 37 | 63 |
| 25 | 2.0 | 825 | 170 | 655 | 79.5 | 15.4 | 3.23 | 350,000 | 0.2 | 36.4 | 63.6 |
| 26 | 2.0 | 1,033 | 143 | 890 | 86.2 | 17.9 | 2.78 | 300,000 | 0 | 36 | 64 |
| 27 | 2.0 | 863 | 152 | 711 | 82.4 | 15.2 | 3.27 | 320,000 | 0.5 | 36.4 | 63.6 |
| 28 | 2.0 | 867 | 168 | 699 | 80.6 | 16.4 | 3.04 | 350,000 | 0.2 | 36.8 | 63.2 |
| 29 | 2.0 | 841 | 190 | 651 | 77.4 | 18.7 | 2.66 | 430,000 | 0.4 | 37 | 63 |
| 32 | 1.0 | 783 | 345 | 438 | 56.0 | 11.7 | 2.12 | 400,000 | 0.2 | 36.4 | 63.4 |
| 33 | 1.0 | 778 | 605 | 173 | 22.2 | 5.3 | 4.70 | 460,000 | 0.4 | 37 | |
| 34 | 1.0 | 921 | 1,157 | | | | | 490,000 | 0.0 | 36.8 | |
| 35 | 2.5 | 931 | 391 | 540 | 58.1 | 16.2 | 3.85 | 450,000 | 0.4 | 37.2 | |
| 36 | 2.5 | 989 | 291 | 698 | 70.6 | 24.3 | 2.56 | 520,000 | 0.3 | 37.4 | |

EXAMPLE II

Air was injected at the tank 12 wall 26 feet below the water surface at point 14.

Air required (1) Assumed same as in Test No. 1.

TYPICAL SLUDGE GAS ANALYSIS

| | 1 | 2 | 3 | 4 | 5 |
|---|---|---|---|---|---|
| Methane | 69.3 | 71.8 | 61.2 | 63.8 | 72.9 |
| Carbon Dioxide | 32.6 | 20.1 | 32.3 | 29.3 | 24.6 |
| Hydrogen Sulfide | | | 2.6 | | .03–0.6 |
| Nitrogen | 1.7 | 0.7 | 2.3 | 4.4 | 1.6 |
| Oxygen | 0 | 0.4 | 0.6 | | 0.6 |
| Carbon Monoxide | 0 | 1.1 | | | |
| Hydrogen | 1.4 | 3.1 | 3.5 | | |

The B.t.u. content of a typical gas is 640 B.t.u. per cu. ft. The present invention is of benefit in the treatment of any digestion gas generating system containing significant amounts of hydrogen sulfide.

Thus, it can be seen according to the present invention that by the injection of oxygen into the liquid sewage sludge, there is obtained a digestion gas containing significantly less hydrogen sulfide. As will be immediately apparent to those skilled in the art, the reduction of hydrogen sulfide in digestion gases is of critical importance in the utilization of digestion gases. There has been a long felt need in the art for the elimination of excess hydrogen sulfide since the sulfides upon combustion produce highly corrosive chemical materials which are not compatible with most engines. This problem has been overcome to a significant extent by the present invention, and hence has substantially improved the usability of large quantities of digestion gases produced in modern sewage treatment plants throughout the world.

Having fully described the invention it is intended that it be limited only by the lawful scope of the appended claims.

I claim:

1. The method for the reduction of the hydrogen sulfide content of digestion gas from the biological decomposition of an aqueous sulfide-containing sludge which comprises injecting oxygen or air directly into said liquid sludge during the biological decomposition of the sludge, the amount of oxygen added being equal to from about the stoichiometric amount required to convert all hydrogen sulfide to sulfur and water up to about four times the stoichiometric amount, and recovering therefrom an evolved fuel gas containing a reduced amount of hydrogen sulfide.

2. The method of claim 1 wherein the digestion is carried out at a temperature of about 100° F.
3. The method of claim 1 wherein the oxygen is injected in the form of air.
4. The method of claim 1 wherein the sludge is in the form of aqueous sewage.
5. The method of claim 1 wherein air is continuously injected and the sludge is continuously recirculated.
6. The method of claim 1 wherein the evolved gas contains a major amount of methane.
7. The method of claim 1 wherein the evolved fuel gas contains less than 1000 p.p.m. of hydrogen sulfide.
8. The method of claim 7 wherein the evolved gas has a heating value of at least 640 B.t.u. cubic foot.

References Cited

UNITED STATES PATENTS

| | | | |
|---|---|---|---|
| 2,430,519 | 11/1947 | Mallory | 210—6 X |
| 2,640,027 | 5/1953 | McNamee et al. | 210—14 X |
| 3,078,999 | 2/1963 | Kelly | 210—14 X |

OTHER REFERENCES

Dawson, P. S. S., et al.: The Oxygen Requirements of Activated Sludge, etc., Sewage Works Journal, July 1949, vol. 21, pp. 643–647 and 649–658, pp. 652–653 particularly relied on.

Bloodgood, D. E.: Gas From Sewage Sludge, Water and Sewage Works, November 1954, pp. 512–514 (copy in G.P. 170) 210—2.

MICHAEL E. ROGERS, *Primary Examiner.*